INVENTOR.
GLEN N. HANSON

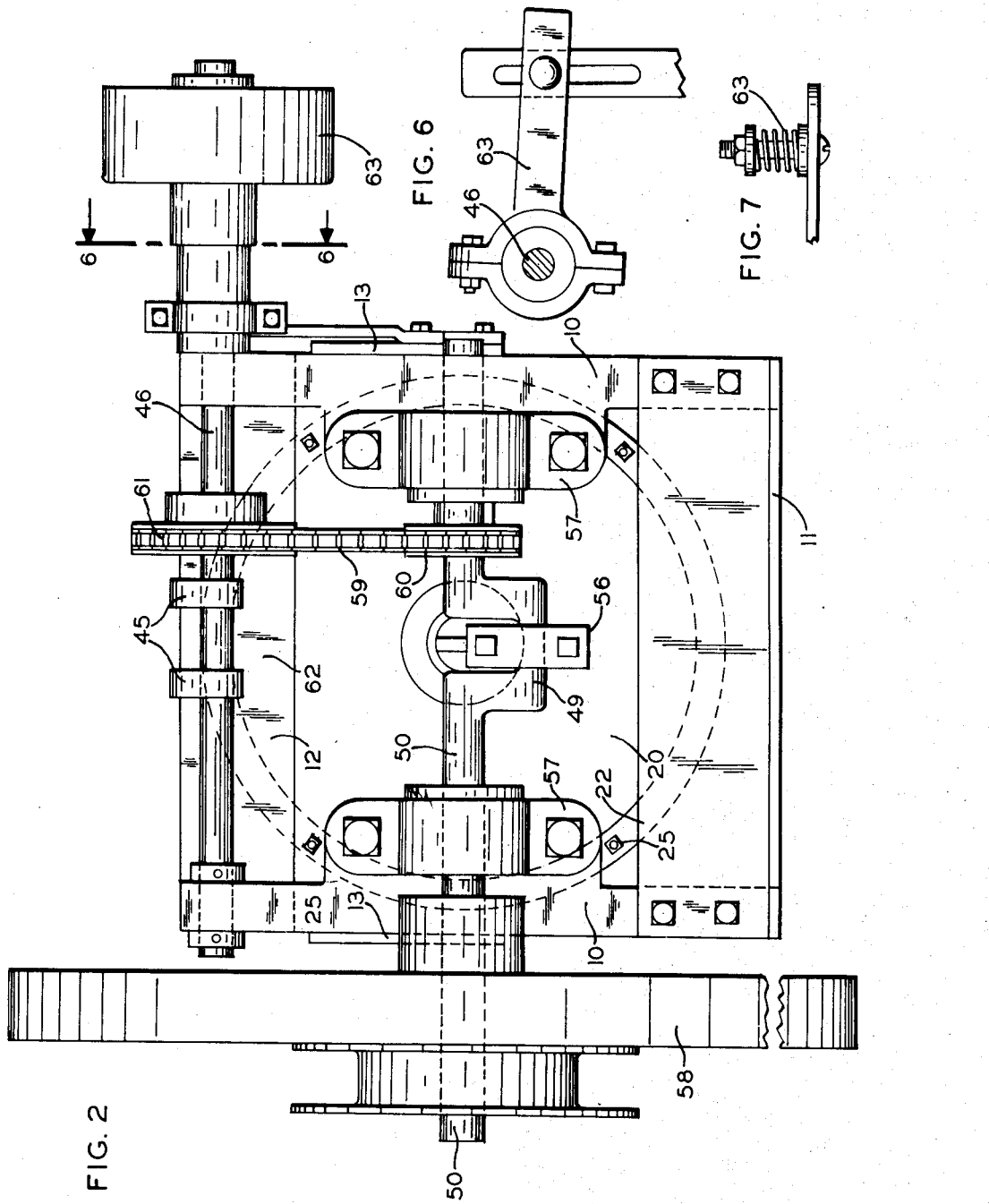

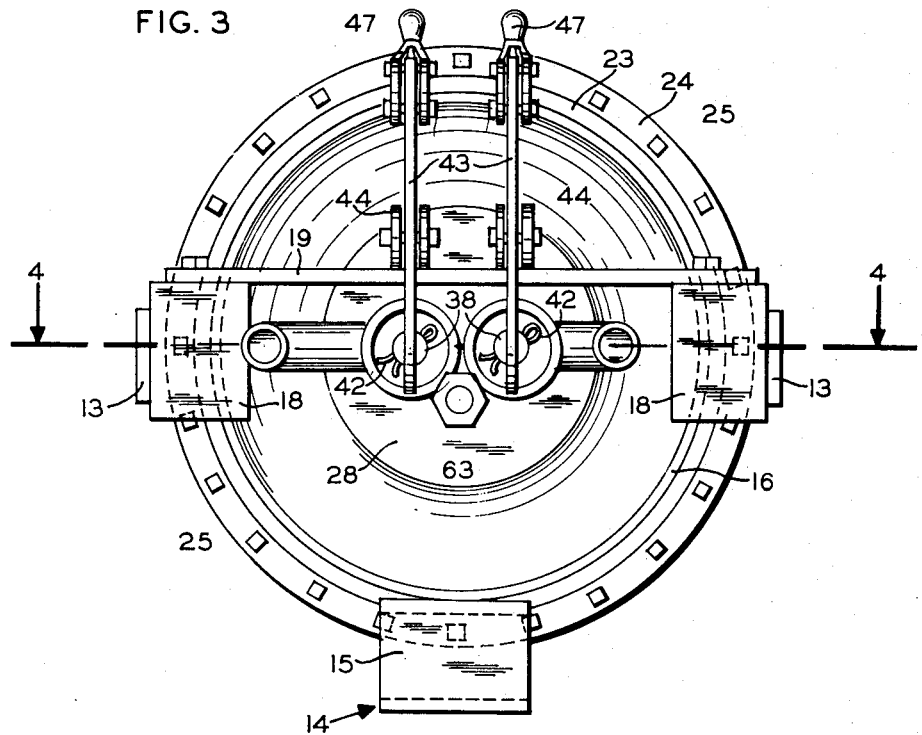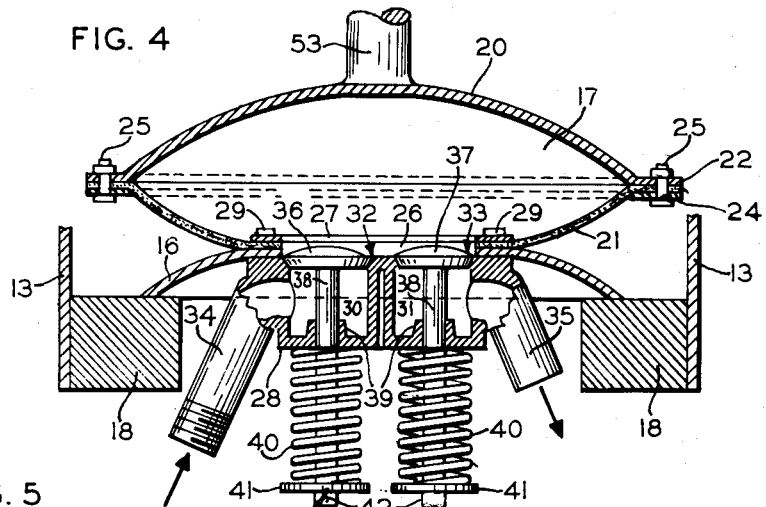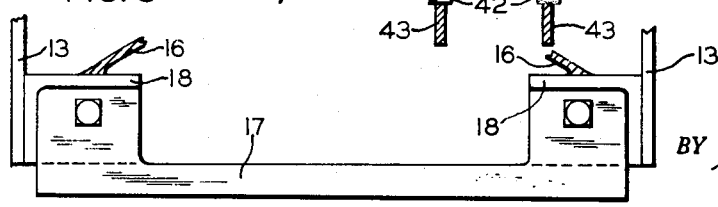

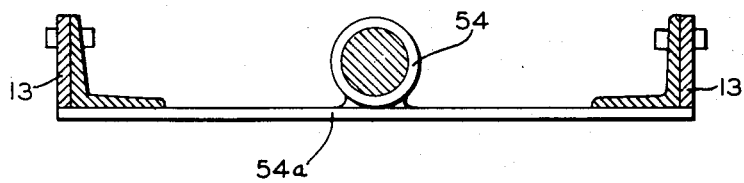
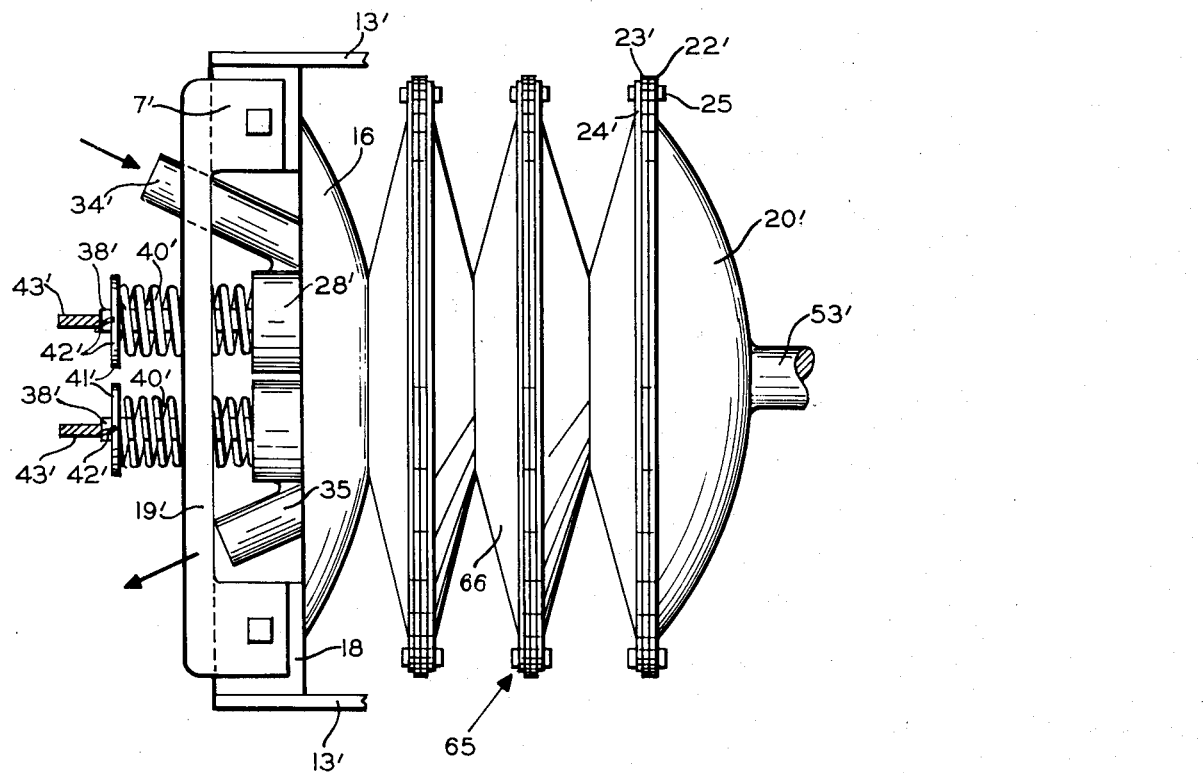
INVENTOR.
GLEN N. HANSON
BY Harry D. Hilgre
ATTORNEY

United States Patent Office 2,712,305
Patented July 5, 1955

2,712,305

INTERNAL COMBUSTION ENGINE HAVING A COMPRESSIBLE COMBUSTION CHAMBER

Glen N. Hanson, Minneapolis, Minn., assignor of twenty per cent to Nathan Meshbisher and twenty per cent to Harry E. Benson, both of Minneapolis, Minn.

Application August 29, 1952, Serial No. 307,015

2 Claims. (Cl. 123—193)

My present invention relates to improvements in internal combustion engines and has for its object to provide such an engine with a combustion chamber in the form of a bellows cylinder that takes the place of the conventional engine block, cylinders, and pistons.

To the above end the invention consists of the novel devices and combination of devices hereinafter described and defined in the claims.

In the accompanying drawings which illustrate the invention, like characters indicate like parts throughout the several views.

Referring to the drawings:

Fig. 2 is a rear end elevation of the same;

Fig. 3 is a front end elevation;

Fig. 4 is a view partly in plan and partly in horizontal section taken on the line 4—4 of Fig. 3;

Fig. 5 is a fragmentary plan view showing the front cross-tie members;

Fig. 6 is a fragmentary view partly in side elevation and partly in section, taken on the line 6—6 of Fig. 2;

Fig. 7 is a fragmentary plan view of the parts shown in Fig. 6;

Fig. 8 is a view partly in elevation and partly in section taken on the line 8—8 of Fig. 1, and Fig. 9 is a view showing a modification of the combustion chamber, some parts being broken away.

Figure 1:
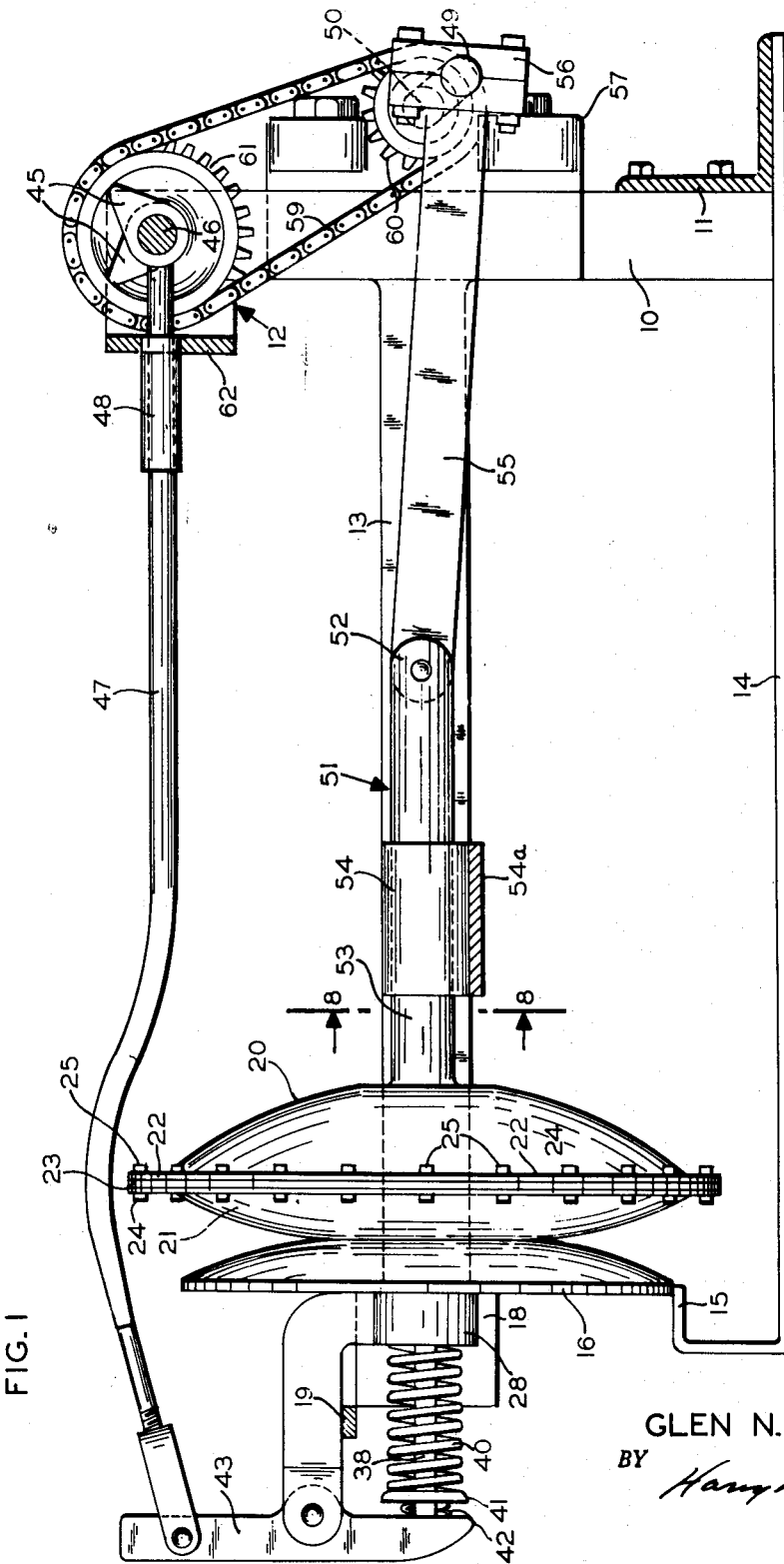
Fig. 1 is a view partly in longitudinal vertical section and partly in side elevation.

The engine frame includes a rear section comprising a pair of legs 10, rigidly connected at their lower end portions by a cross-tie angle bar 11 having wide flanges and an upper flat cross-tie bar 12. The engine frame further includes a pair of flat side bars 13 rigidly attached at their rear ends to the legs 10 at their intermediate portions, and a bottom flat bar 14 rigidly secured at its rear end to the angle bar 11 at its longitudinal center.

The bottom bar 14, at its front end portion, is bent upright and then horizontal rearwardly to afford a support 15 for a vertically disposed metal disk 15' that extends transversely of the engine frame and affords a fixed front head 16 for a combustion chamber 17 which is the subject matter of the present application for patent. This head 16 is concavo-convex with its convex side toward the rear of the engine.

A rectangular block 18 is rigidly secured to the outer end of each of the side bars 13 and a cross-tie member 19 connects the two blocks 18, Figs. 1 and 5. The head 16 extends between the blocks 18 parallel to the cross-tie member 19, and is rigidly secured to the backs of said blocks at diametrically opposite points, Figs. 4 and 5.

The combustion chamber 17 further includes a movable rear head 20 and an intermediate flexible member 21 that connects the movable head 20 to the fixed head 16. Both the movable head 20 and the flexible member 21 are concavo-convex and their concave sides are in opposing relation. The flexible member 21 is formed of asbestos or other suitable noncombustible material.

The movable head 20 and the flexible member 21 have at their perimeters, overlapping annular flanges 22 and 23, respectively. Applied to the outer side of the flanges 23 is an annular metal reinforcing flat ring 24. A multiplicity of circumferentially spaced nut equipped bolts 25 extend through aligned holes in the flanges 22 and 23 and the ring 24. The flange 23 of the flexible section 21 is clamped between the flanges 22 and the ring 24 and forms a fluidtight joint between the flanges 22 and 23.

Formed in the flexible member 21, at its axis, is a large annular passageway 26 applied to the flexible member 21 on its concave side, and surrounding the passageway 26 is an annular metal reinforcing ring 27.

A casting 28 on the convex side of the fixed head 16 at its axis, is rigidly secured thereto by a multiplicity of circumferentially spaced nut equipped studs 29. These studs 29, are anchored to the casting 28, extend through aligned holes in the fixed head 16, the flexible member 21 and the ring 24. These studs 29 clamp the flexible member 21 between the fixed head 16 and the ring 24 and form a fluidtight joint between the fixed head 16 and the flexible member 21.

Within the casting 28 is a fluid intake chamber 30 and an exhaust chamber 31 having communication with the combustion chamber 17 through the passageway 26 and ports 32 and 33 respectively. A nipple 34, integral with the casting 28 that leads into the fluid chamber 30, has screw threaded outer end portion for a connection from a carburator, not shown. Also integral with the casting 28 is an exhaust nipple 35 that leads from the exhaust chamber 31 to the atmosphere.

Valves 36 and 37 for opening and closing the ports 32 and 33 respectively, each have a stem 38 that extends outwardly through a hole in a boss 39 on the inner side of one of the chambers 30 or 31. Each valve 36 and 37 is yieldingly closed by a coiled spring 40. The springs 40 encircle the valve stems 38 and are compressed between the casting 28 and washers 41, on the valve stems 38. Cotter pins 42 hold the washers 41 on the valve stems 38.

Each valve 36 and 37 is opened by a tappet 43 intermediately pivoted to a bracket 44. The brackets 44 overlie the valve stems 38 and are secured to the cross tie member 19 with the lower end portions of the tappets 43 engaging the valve stems 38 at their outer ends, Figs. 1, 4, and 5.

The tappets 43 are operated in timed relation to open the valves 36 and 37 by cams 45 on a camshaft 46 and a pair of long push rods 47. The camshaft 46 is journaled in the upper end portions of the legs 10 and the push rods 47 at their front ends to the tappets 43 at their upper end portions. These push rods 47, at their rear end portions are slidable in long sleeve bearings 48, fixed relative to the cross tie bar 12 with their rear ends positioned to be engaged by the cams 45.

The movable head 20 is connected to a crank 49 on a crank shaft 50 by a long shaft 51 having an intermediate joint 52 that turns on a horizontal axis. The inner sections 53 of the shaft 51 are fixed at its forward end to the movable head 20, at its axis, and are axially aligned with said axis. This shaft section 52 works endwise slidable in a bearing 54 fixed on a tie bar 54ᵃ that connects the two side bars 13, Figs. 1 and 8. The rear sections 55 of the shaft 51 are attached to the crank 49 by a bearing 56 on its rear end. The crank shaft 50 is journaled in bearings 57 on the legs 10 and a flywheel 58 is mounted on one end portion of said crank shaft.

The cam shaft 46 is driven from the crank shaft 50 by a sprocket chain 59 that runs under a relatively small sprocket wheel 60 on said crank shaft and over a relatively large sprocket wheel 61 on said cam shaft, Figs. 1 and 2.

The cross tie bar 12 is offset at 62 to afford clearance for the cams 45 and the sprocket wheel 61. A timer for the cams 45 is mounted on the camshaft 46 and is indicated as an entirety by the numeral 63, Figs. 2, 6, and 7.

A spark plug 64 is attached to the casting 24 for igniting the fuel mixture in the combustion chamber 17. Mounted on the crank shaft 50, outwardly of the flywheel 58 is the conventional rope operated starting pulley 65.

From the above description it will be evident that the explosion of a fuel mixture in the combustion chamber 17 will expand said chamber and operate the crank 49 through the shaft 51 and said crank in turn will compress the chamber 17 and the fuel mixture therein or discharge the burnt fuel mixture in said chamber.

It will be further understood that obviously, in the elimination of the conventional heavy cylinder block and heads, my new engine lends itself well to light weight construction and by the same token is relatively much cheaper to manufacture by the elimination of heavy castings. Such light weight and inexpensive construction make my new engine particularly well adapted for use in connection with powered equipment such as lawn mowers, garden tractors, powered wheel barrows and the like.

Referring now in detail to the modification shown in Fig. 9, the parts thereof that correspond to like parts in Figs. 1 through 8 are given the same reference characters followed by a prime ('). In this modification of the invention, the flexible section 65 of the combustion chamber is enlarged by forming therein, accordian pleats 66.

As shown the engine is of single cylinder construction but it will be understood that a multiplicity of combustion units as herein described may be used as in conventional internal combustion engines merely by arranging said units to act on a common crank shaft.

While there are herein disclosed but a limited number of embodiments of the structure, process and product of the invention herein presented, it is possible to produce still other embodiments without departing from the inventive concept herein disclosed, and it is desired, therefore, that only such limitations be imposed upon the appended claims as are stated herein, or required by the prior art.

What I claim is:

1. In an internal combustion engine, a movable rigid rear head, a flexible member and a fixed rigid front head, each of which is annular and concavo-convex, said rear head and flexible member being connected at their perimeters with their concave sides in opposing relation, said flexible member and front head being connected at their central portions, said rear head and flexible member internally affording a combustion chamber, valve-equipped fuel intake and exhaust ports leading into the combustion chamber, and means for reciprocating the movable rear head to compress a fuel charge in the combustion chamber and thereby press the flexible member onto the convex side of the front head to support and turn the same inside out.

2. The invention defined in claim 1, further including a casting fixed to the concave side of the front head and in which casting the ports are formed and the valves mounted.

References Cited in the file of this patent

UNITED STATES PATENTS

| | | |
|---|---|---|
| 1,180,947 | Scott | Apr. 25, 1916 |
| 1,181,802 | Rogge | May 2, 1916 |
| 1,231,302 | Scott | June 26, 1917 |
| 1,538,166 | Cass | May 19, 1925 |
| 1,550,703 | Knott | Aug. 25, 1925 |
| 1,905,585 | Giesler | Apr. 25, 1933 |